United States Patent
Kaskowicz

(10) Patent No.: US 11,203,242 B2
(45) Date of Patent: Dec. 21, 2021

(54) VEHICLE COMPRISING ENERGY HARVESTING SUSPENSION SYSTEM, AND METHOD FOR CONVERTING MECHANICAL ENERGY INTO ELECTRICAL ENERGY

(71) Applicant: Matthew Alan Kaskowicz, Fort Mill, SC (US)

(72) Inventor: Matthew Alan Kaskowicz, Fort Mill, SC (US)

( * ) Notice: Subject to any disclaimer, the term of this patent is extended or adjusted under 35 U.S.C. 154(b) by 0 days.

(21) Appl. No.: 16/911,983

(22) Filed: Jun. 25, 2020

(65) Prior Publication Data
US 2020/0324601 A1   Oct. 15, 2020

Related U.S. Application Data

(63) Continuation of application No. 16/807,651, filed on Mar. 3, 2020, now Pat. No. 10,723,193, which is a (Continued)

(51) Int. Cl.
*B60K 25/10* (2006.01)
*B60G 13/14* (2006.01)
(Continued)

(52) U.S. Cl.
CPC .............. *B60G 13/14* (2013.01); *B60K 25/10* (2013.01); *F03B 1/00* (2013.01); *F03B 13/00* (2013.01);
(Continued)

(58) Field of Classification Search
CPC ........ B60K 6/12; B60K 25/10; B60K 25/106; B60K 2006/123; B60K 2006/126
(Continued)

(56) References Cited

U.S. PATENT DOCUMENTS 4,024,926 A * 5/1977 Butoi .................... B60K 25/10
180/65.245
4,032,829 A * 6/1977 Schenavar ............. B60G 13/14
322/3

(Continued)

OTHER PUBLICATIONS

U.S. Appl. No. 10/723,193, filed Jul. 28, 2020.
U.S. Appl. No. 10/583,707, filed Mar. 10, 2020.
PCT/US2016/000106, Nov. 6, 2016 (Expired).

*Primary Examiner* — Jeffrey J Restifo
(74) *Attorney, Agent, or Firm* — Schwartz Law Firm, P.C.

(57) ABSTRACT

A vehicle incorporates a gravity-assist energy harvesting suspension system including one or more gravitational positive displacement pumps. The positive displacement pump has a cylinder and a reciprocating piston inside the cylinder. The piston is adapted for movement along a compression stroke and an opposite extension stroke in response to a gravitational bounce of the vehicle when in motion. A turbine comprising a rotor shaft and attached blades is mounted relative to a distal end of a fluid outlet hose connected to the pump. Fluid discharged through the outlet hose acts on the blades, thereby moving and imparting rotational energy to the rotor shaft. A generator is operatively connected to the turbine, and is adapted for converting the rotational energy generated by the rotor shaft to electrical energy.

12 Claims, 5 Drawing Sheets

Related U.S. Application Data continuation of application No. 15/771,608, filed as application No. PCT/US2016/000106 on Nov. 7, 2016, now Pat. No. 10,583,707.

(60) Provisional application No. 62/252,046, filed on Nov. 6, 2015.

(51) Int. Cl.
| | |
|---|---|
| *F03G 7/08* | (2006.01) |
| *F15B 1/027* | (2006.01) |
| *F03B 1/00* | (2006.01) |
| *F03B 13/00* | (2006.01) |
| *F03G 7/00* | (2006.01) |
| *F16F 15/023* | (2006.01) |
| *B60K 1/04* | (2019.01) |

(52) U.S. Cl.
CPC .............. *F03G 7/00* (2013.01); *F03G 7/08* (2013.01); *F15B 1/027* (2013.01); *F16F 15/023* (2013.01); *B60G 2300/07* (2013.01); *B60G 2300/13* (2013.01); *B60G 2300/60* (2013.01); *B60K 1/04* (2013.01); *B60K 2025/106* (2013.01); *B60Y 2200/91* (2013.01); *F05B 2220/602* (2013.01); *F05B 2240/941* (2013.01); *Y02E 10/20* (2013.01)

(58) Field of Classification Search
USPC ........................................................ 180/165
See application file for complete search history.

(56) References Cited

U.S. PATENT DOCUMENTS

| | | | | | |
|---|---|---|---|---|---|
| 4,295,538 | A * | 10/1981 | Lewus | .................... | B60G 13/14 180/165 |
| 5,091,679 | A * | 2/1992 | Murty | ................. | B60G 17/0157 180/165 |
| 5,570,286 | A * | 10/1996 | Margolis | ................. | B60N 2/501 701/36 |
| 5,590,734 | A * | 1/1997 | Caires | .................... | B60G 13/14 180/165 |
| 6,111,375 | A * | 8/2000 | Zenobi | .................... | B60G 13/14 180/65.1 |
| 6,758,295 | B2 * | 7/2004 | Fleming | .................... | F03D 9/12 180/165 |
| 6,966,394 | B2 | 11/2005 | Fleming | | |
| 7,261,171 | B2 * | 8/2007 | de la Torre | ............ | B60G 13/14 180/165 |
| 7,357,396 | B2 | 4/2008 | Dellacha | | |
| 7,387,182 | B2 * | 6/2008 | Fleming | .................. | B60L 50/40 180/165 |
| 7,938,217 | B2 * | 5/2011 | Stansbury, III | ........ | B60K 25/10 180/165 |
| 7,942,225 | B2 * | 5/2011 | Carabelli | .................. | F03G 7/08 180/165 |
| RE42,989 | E | 12/2011 | Eadie et al. | | |
| 8,098,040 | B1 | 1/2012 | Botto | | |
| 8,261,865 | B2 * | 9/2012 | Stansbury, III | .... | B60G 17/0272 180/65.31 |
| 8,344,526 | B2 * | 1/2013 | Bhat | ...................... | B60K 25/10 290/1 R |
| 8,376,100 | B2 * | 2/2013 | Avadhany | .............. | B60G 13/14 188/316 |
| 8,479,859 | B1 * | 7/2013 | Okamoto | ............... | B60K 25/10 180/165 |
| 8,807,258 | B2 * | 8/2014 | Stansbury, III | ........... | H02J 7/00 180/165 |
| 8,820,064 | B2 * | 9/2014 | Six | ....................... | B60G 17/056 60/414 |
| 8,839,920 | B2 * | 9/2014 | Anderson | .............. | B60K 25/10 188/322.21 |
| 9,030,033 | B2 * | 5/2015 | Yoo | ........................... | F03G 7/08 290/1 C |
| 9,481,221 | B2 * | 11/2016 | Reybrouck | ............... | F16F 9/46 |
| 9,738,162 | B2 * | 8/2017 | Ferri | ................... | B60W 10/188 |
| 9,975,426 | B2 * | 5/2018 | McCann | ................. | B60K 6/12 |
| 10,052,926 | B2 * | 8/2018 | Conti | ..................... | B60K 25/10 |
| 10,583,707 | B2 * | 3/2020 | Kaskowicz | ............ | B60K 25/10 |
| 10,723,193 | B2 * | 7/2020 | Kaskowicz | ............... | F03G 7/00 |
| 2009/0229902 | A1 * | 9/2009 | Stansbury, III | ........ | B60K 25/10 180/165 |
| 2012/0240564 | A1 * | 9/2012 | Wesolowski | ............. | B60K 6/12 60/327 |
| 2015/0152888 | A1 * | 6/2015 | Six | ......................... | F15B 1/027 60/327 |

\* cited by examiner

VEHICLE COMPRISING ENERGY HARVESTING SUSPENSION SYSTEM, AND METHOD FOR CONVERTING MECHANICAL ENERGY INTO ELECTRICAL ENERGY

TECHNICAL FIELD AND BACKGROUND OF THE DISCLOSURE

The present disclosure relates broadly and generally to a vehicle comprising a gravity-assist energy harvesting suspension system, and method for converting mechanical energy into electrical energy.

In one exemplary embodiment, the present disclosure allows the constant gravitational effect on a vehicle in motion to be converted via mechanical means in to electrical energy. The power output depends on the weight of the vehicle (mass) and the speed at which the vehicle is moving—following the mathematical principle Energy=Mass*Speed^2. The closed-loop nature of the exemplary system, including all available pumps (for each wheel), allows for the entire mass of the vehicle to be used for power generation; as opposed to having four separate closed systems (one for each wheel), which would only benefit from the weight in a single designated corner of the vehicle. There are no emissions, no pollutants, and no external fuel source needed to produce the electrical power.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a vehicle having a plurality of wheels, a frame carried on the wheels, and a suspension system operatively connecting the frame to the wheels. A gravitational positive displacement pump is operatively mounted between the wheels and the frame, and comprises a cylinder and a reciprocating piston inside the cylinder. The piston is adapted for (linear) movement along a compression stroke and an extension stroke in response to a gravitational bounce of the vehicle when in motion. A fluid inlet hose is connected to an onboard fluid source and to the displacement pump. The inlet hose is adapted for drawing fluid into the cylinder as the piston travels along its extension stroke. A fluid outlet hose is connected to the displacement pump, and has a distal end adapted for discharging fluid from the cylinder as the piston travels along its compression stroke. A turbine comprising a rotor shaft and attached blades is mounted relative to the distal end of the fluid outlet hose. Fluid discharged through the outlet hose acts on the blades, thereby moving and imparting rotational energy to the rotor shaft. A generator is operatively connected to the turbine, and is adapted for converting the rotational energy generated by the rotor shaft to electrical energy. A battery is operatively connected to the generator, and is adapted for storing the electrical energy produced by the generator to power electrical components (e.g., electrical subsystems, electric motors) of the vehicle.

The term "vehicle" refers broadly herein to any personal, passenger, recreational, commercial, or industrial land or water vehicle. The term "suspension system" refers to any one or more of the vehicle tires, tire air, springs, shock absorbers and linkages that connects the vehicle to its wheels and allows relative motion between the two. The term "fluid inlet hose" refers to any single continuous hose, or a plurality of individual but directly connected hoses, or a combination of directly connected hoses and indirectly connected hoses (meaning "in fluid-communication") which function to enable transfer of fluid from a fluid source to the positive displacement pump. Likewise, term "fluid outlet hose" refers to any single continuous hose, or a plurality of individual but directly connected hoses, or a combination of directly connected hoses and indirectly connected hoses (meaning "in fluid-communication") which function to enable transfer of fluid from the positive displacement pump to the turbine.

According to another exemplary embodiment, an electric motor is operatively connected to the battery, and is adapted for propelling the vehicle.

According to another exemplary embodiment, the positive displacement pump is substantially vertically-disposed between the wheels and the frame.

According to another exemplary embodiment, the fluid outlet hose comprises a nozzle for accelerating fluid discharged through its distal end.

According to another exemplary embodiment, respective flow control valves communicate with the fluid inlet and fluid outlet hoses.

According to another exemplary embodiment, the vehicle comprises a plurality of gravitational positive displacement pumps, wherein a single pump is located adjacent each wheel of the vehicle.

According to another exemplary embodiment, the suspension system comprises a coil spring formed adjacent the gravitational positive displacement pump at each wheel of the vehicle.

According to another exemplary embodiment, at least one hydraulic accumulator is located between the proximal and distal ends of the fluid outlet hose.

According to another exemplary embodiment, first and second hydraulic accumulators are located between the proximal and distal ends of the fluid outlet hose.

According to another exemplary embodiment, a fluid control manifold communicates with the fluid outlet hose, and is adapted for selectively directing fluid to one of the first and second hydraulic accumulators.

According to another exemplary embodiment, an electrochemical capacitor is located between the generator and the battery.

According to another exemplary embodiment, the electrochemical capacitor comprises an ultracapacitor (or "supercapacitor").

According to another exemplary embodiment, the onboard fluid source comprises a fluid collection reservoir located beneath the generator.

According to another exemplary embodiment, the fluid collection reservoir comprises a baffle assembly adapted for limiting fluid slosh when the vehicle is in motion.

In another exemplary embodiment, the disclosure comprises a vehicle incorporating a gravitational positive displacement pump. The positive displacement pump comprise a cylinder and a reciprocating piston inside the cylinder. The piston is adapted for (linear) movement along a compression stroke and an opposite extension stroke in response to a gravitational bounce of the vehicle when in motion. A fluid inlet hose is connected to an onboard fluid source and to the displacement pump. The inlet hose is adapted for drawing fluid into the cylinder as the piston travels along its extension stroke. A fluid outlet hose is connected to the displacement pump, and has a distal end adapted for discharging fluid from the cylinder as the piston travels along its compression stroke. A turbine comprising a rotor shaft and attached blades is mounted relative to the distal end of the fluid outlet hose. Fluid discharged through the outlet hose acts on the blades, thereby moving and imparting rotational energy to the rotor shaft. A generator is operatively connected to the turbine, and is adapted for converting the rotational energy generated by the rotor shaft to electrical energy. A battery is operatively connected to the generator, and is adapted for storing the electrical energy produced by the generator to power electrical components of the vehicle.

In yet another exemplary embodiment, the present disclosure comprises a method for converting mechanical energy into electrical energy for a vehicle. The method includes installing a gravitational positive displacement pump in the vehicle. The positive displacement pump comprises a fluid cylinder and a reciprocating piston inside the cylinder. The piston is adapted for (linear) movement along a compression stroke and an opposite extension stroke in response to a gravitational bounce of the vehicle when in motion. Fluid is drawn into the cylinder of the displacement pump through a fluid inlet hose as the piston travels along its extension stroke. Fluid is discharged from the cylinder through a fluid outlet hose as the piston travels along its compression stroke. A turbine is mounted relative to a distal end of the fluid outlet hose, such that fluid discharged through the outlet hose imparts rotational energy to the turbine. A generator is operatively connected to the turbine to convert the rotational energy generated by the turbine to electrical energy. The electrical energy produced by the generator is then stored in a battery to power electrical components of the vehicle.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
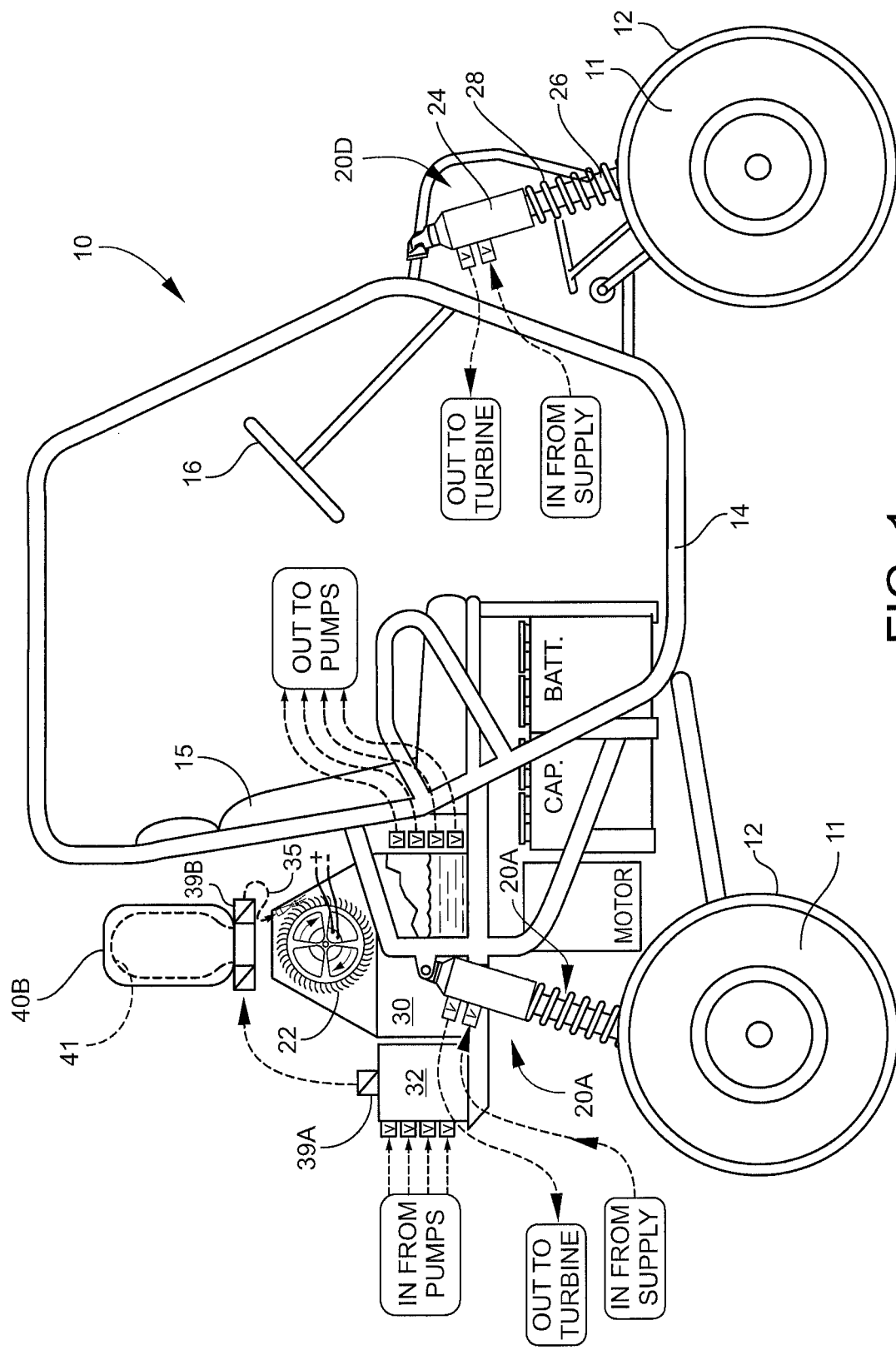
FIG. 1 is a side schematic view of an exemplary vehicle incorporating the present energy harvesting suspension system of the present disclosure.

Referring now specifically to the drawings, a vehicle comprising an energy harvesting suspension system according to one exemplary embodiment is illustrated in FIG. 1, and shown generally at broad reference numeral 10. The present vehicle 10 incorporates conventional features, such as wheels 11 and tires 12, a frame assembly 14 (e.g., chassis) carried on the wheels 11, a driver seat 15, and steering wheel 16. The exemplary suspension system operatively connects the frame assembly 14 to the wheels 11, and comprises four gravitational positive displacement pumps 20A, 20B, 20C, and 20D—one pump for each of the four vehicle wheels 11 (See FIG. 2). As described further below, the positive displacement pumps 20A-20D cooperate to move fluid (e.g, water) used to drive a hydroturbine 22. The exemplary turbine 22 may comprise Pelton or Turgo style wheel, both generally known and understood in the art. The components and operation of a single positive displacement pump 20A—referred to generically as pump 20—is described below, it being understood that the remaining three pumps 20B-20D comprise identical components and operate in an identical manner.

Figure 2:
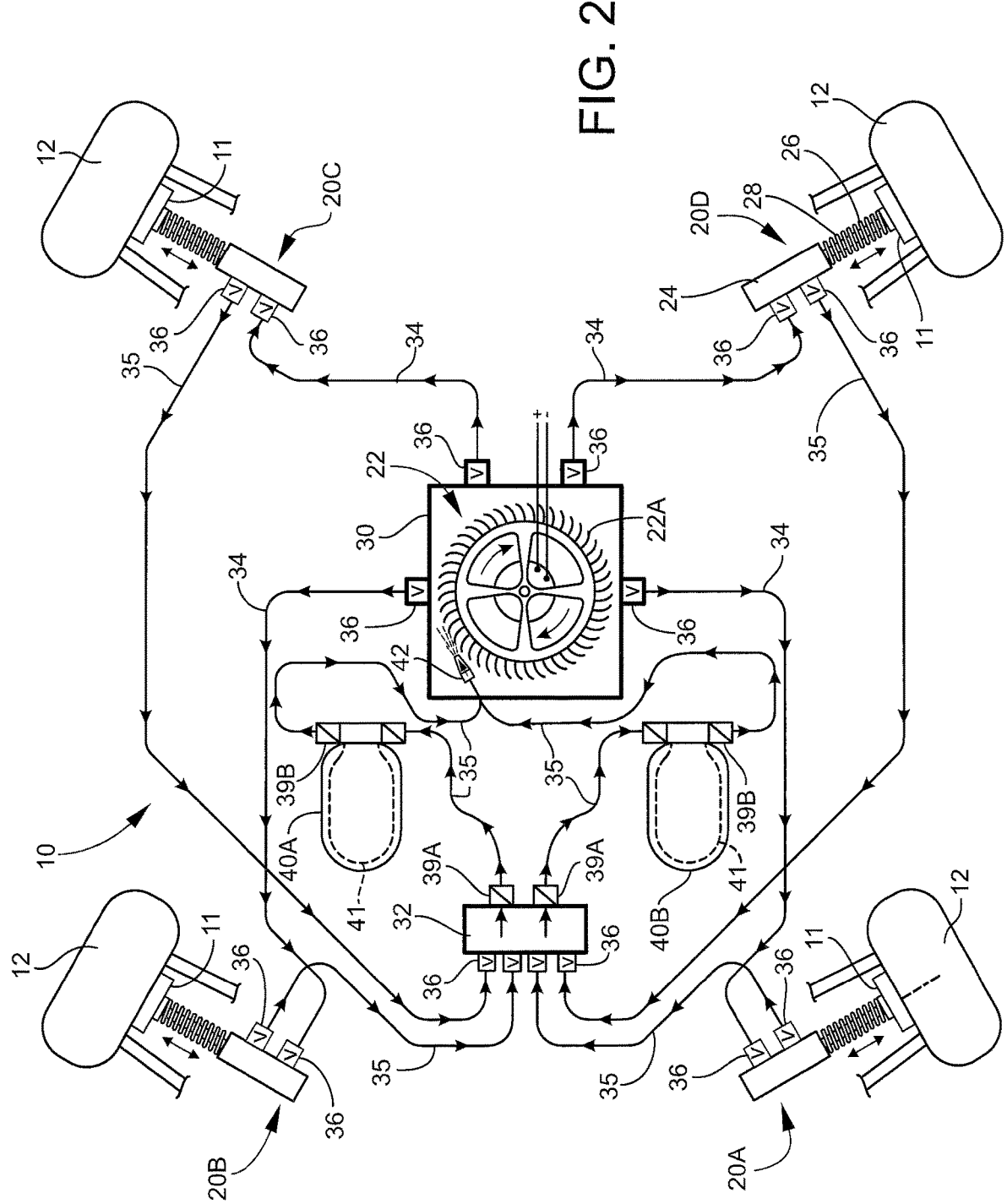
FIG. 2 is a top plan schematic view of the exemplary vehicle incorporating the present energy harvesting suspension system.
Figure 4:
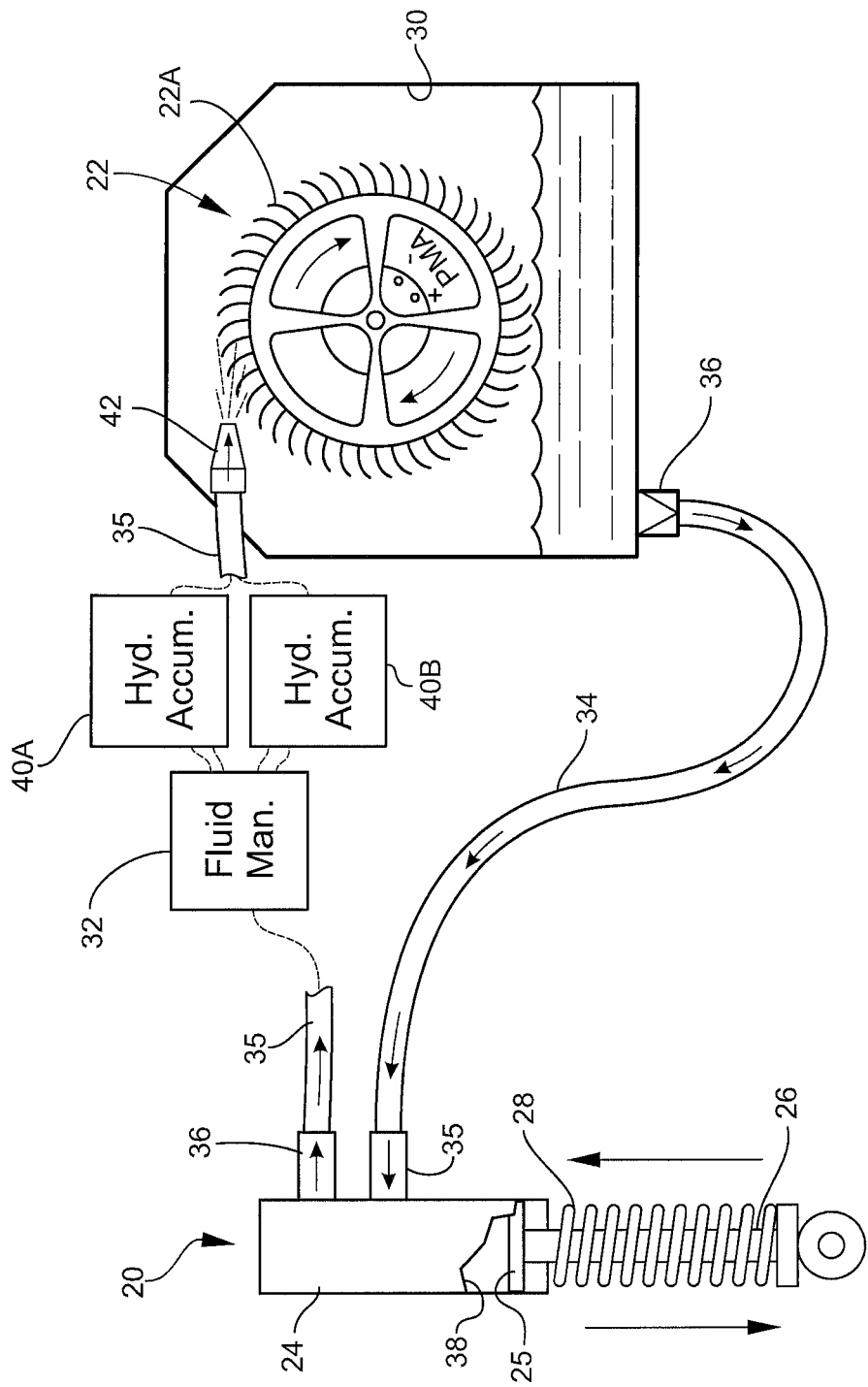
FIG. 4 is a further schematic view illustrating components of the fluid circuit in the present energy harvesting suspension system.

Referring to FIGS. 1, 2 and 4, the exemplary positive displacement pump 20 comprises a fluid cylinder 24, a reciprocating piston 25 (FIG. 4) inside the cylinder 24, and an elongated piston stem 26 surrounded by a heavy metal spring 28. The fluid cylinder 24 communicates with a fluid supply reservoir 30 and discharge manifold 32 through an assembly of inlet hoses 34, outlet hoses 35, and check valves 36. The piston 25 is designed to travel up and down inside the cylinder 24 along a compression stroke and an opposite extension stroke in response to a gravitational "bounce" of the vehicle 10 when in motion. During the extension stroke, fluid is suctioned from the fluid supply reservoir 30 through the inlet hose 34 and check valves 36, and into a sealed fluid cavity 38 (FIG. 4) of the cylinder 24. As the vehicle 10 bounces on spring 28 and the adjacent tire 12, the piston's compression stroke collapses the fluid cavity 38 inside cylinder 24 causing the fluid to discharge through the outlet hose 35 and check valves 36, and into the discharge manifold 32. The simple harmonic motion or oscillation of the moving vehicle 10 up and down on the spring 28 causes repeated gravity-induced actuation of the piston 25 inside the fluid cylinder 24. In the exemplary embodiment, all four of the positive displacement pumps 20A-20D operate simultaneously adjacent respective wheels 11 of the vehicle 10 to transfer fluid from the fluid reservoir 30 to the discharge manifold 32. If desired, the vehicle bounce may be dampened by adding various hydraulic gates, valves, and other fluids (e.g., gases) to each displacement pump 20A-20D, such that the pumps function much like that of conventional shock absorbers.

Figure 3:
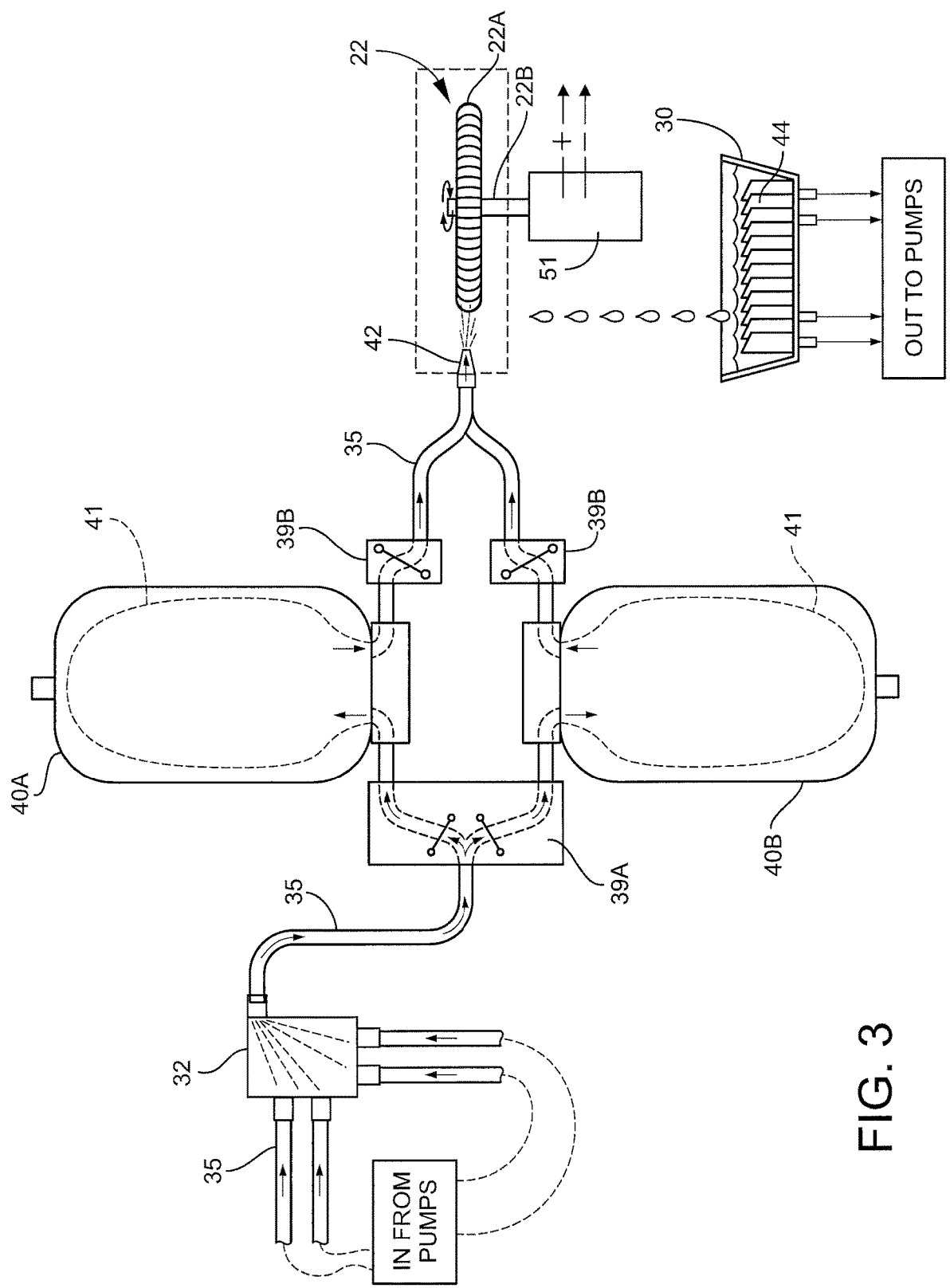
FIG. 3 is a further schematic view illustrating operation of the hydraulic accumulators.
Figure 5:
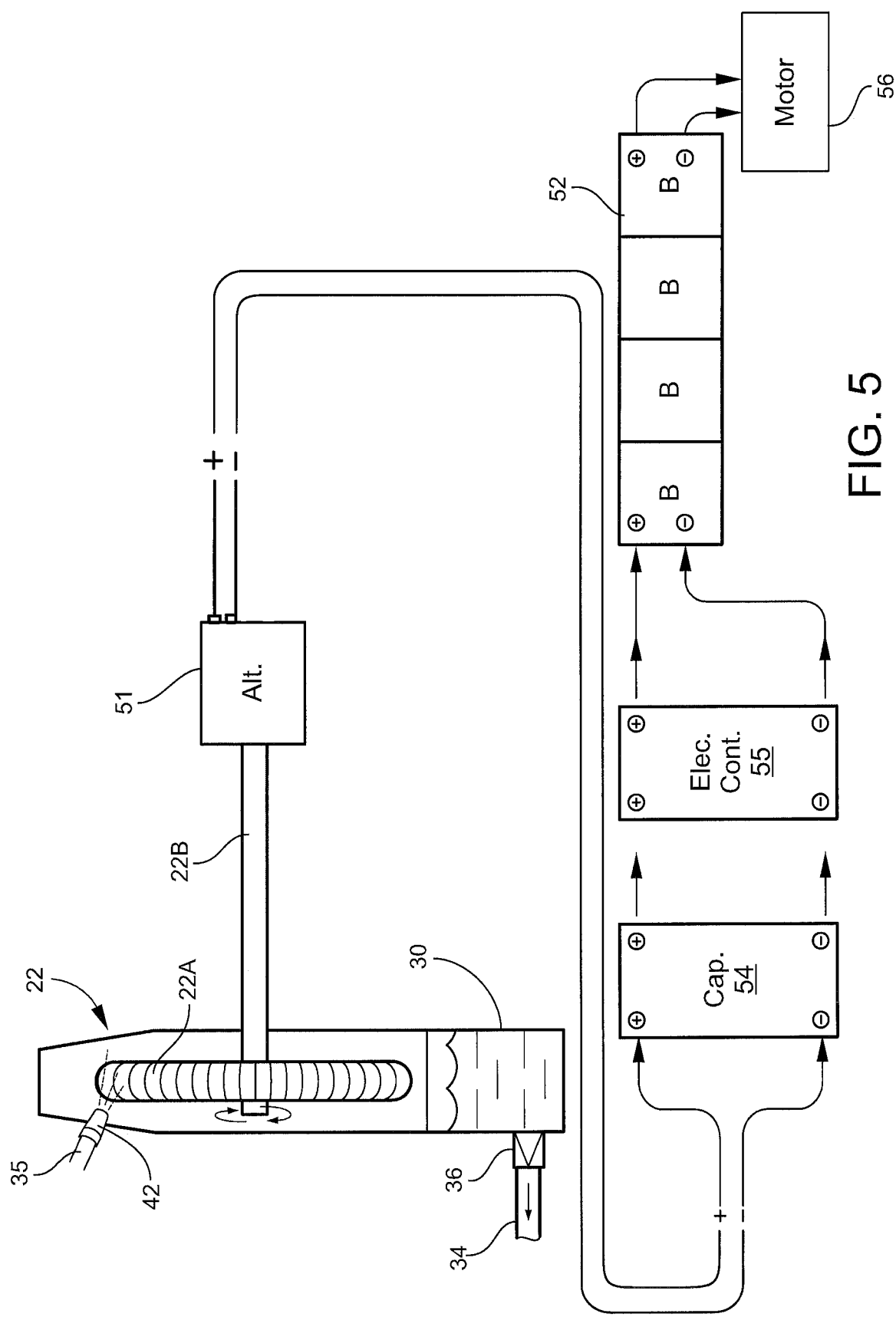
FIG. 5 is a further schematic view illustrating operation of the hydroturbine and generator designed for charging a bank of vehicle batteries to power the vehicle's electric motor.

Referring to FIGS. 3, 4, and 5, from the discharge manifold 32 fluid is moved through outlet hoses 35, electronic flow-control valves 39A, 39B, and into a selected one of two standard hydraulic accumulators 40A, 40B. Each accumulator 40A, 40B has an internal flexible fluid bladder 41, and a preset degree of internal air pressure which functions to push against the bladder 41. The flow-control valves 39A, 39B operate to control the switching necessary to feed one accumulator 40A, 40B versus the other. Once a maximum amount of fluid has been pumped into the first accumulator 40A, the intake valve 39A will close off any additional flow and the output valve 39B will open, thereby allowing the pressurized fluid to be pushed out from a distal end of the outlet hose 35 and sprayed onto blades 22A of turbine 22. A nozzle 42 may be attached to the outlet hose 35 to accelerate the discharge of fluid. As the first accumulator 40A is emptying and spraying the turbine 22, the flow valves 39A, 39B of the second accumulator 40B are opposite, meaning the flow that was feeding the first accumulator 40A will now be feeding the second accumulator 40B as the first is spraying. When the second accumulator 40B is full and the first accumulator 40A is empty, the flow valves 39A, 39B switch again—back and forth. This allows one accumulator 40A, 40B to be constantly spraying, while the other is filling, thereby creating a constant stream of pressurized fluid capable of rotating the turbine 22 without interruption. Spent fluid used to drive the turbine 22 passes back into the fluid reservoir 30 (arranged beneath the turbine 22) and is recycled in a circuit through the process described above. The exemplary reservoir 30 may comprise a baffle assembly 44 to limit sloshing when the vehicle is in motion.

As best illustrated in FIG. 5, as pressurized fluid is sprayed across the blades 22A of the turbine 22, actuation of rotor shaft 22B acts upon an electric generator 51 (e.g., alternator) to create an electric current sufficient to charge a bank of onboard vehicle batteries 52. Because the electrical power output of the generator 51 will vary depending on the available fluid flow, one or more ultracapacitors 54 and current controller 55 may be added between the generator 51 and batteries 52. Adding ultracapacitors 54 may overcome the need for a constant high spinning rate of the generator 51. Ultracapacitors 54 are able to collect and accumulate varying and low level power outputs, and then turn around and discharge at any desired output. Meaning, the ultracapacitor can collect a "trickle charge" varying around 1V-10V. Once the capacitor 54 has absorbed as much electrical energy as possible, it can then discharge its entire capacity via current controller 55 at any voltage rate desired in a quick burst. This enables the generator 51 to provide low voltage output, while still allowing the batteries 52 to be charged at the higher voltage necessary. The charged batteries 52 may then be used to power the vehicle's electric drive motor 56, electrical subsystems, and/or other onboard electrical devices.

In alternative exemplary embodiments, the present energy harvesting system may be incorporated in any other land vehicle, such as freight and passenger trains, motorcycles, dirt bikes, motorized scooters, two-wheeled motorized personal vehicles, golf carts, and any other such vehicles comprising passive, active, semi-active, dependant, independent, or semi-independent suspension systems. Additionally, the exemplary energy harvesting systems may be incorporated in any type and style of water craft.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A vehicle, comprising:
   a plurality of wheels;
   a frame carried on said wheels;
   a suspension system operatively connecting said frame to said wheels;
   a gravitational positive displacement pump operatively mounted between said wheels and said frame, and adapted for operational movement in response to a gravitational bounce of the vehicle when in motion;
   an onboard fluid source;
   a fluid inlet hose connected to said fluid source and said displacement pump;
   a fluid outlet hose having a proximal end connected to said displacement pump, and a distal end adapted for discharging fluid from said displacement pump;
   at least one hydraulic accumulator located between the proximal and distal ends of said fluid outlet hose;
   a fluid control manifold communicating with said fluid outlet hose, and adapted for selectively directing fluid to said hydraulic accumulator;
   a turbine comprising a rotor shaft and attached blades, said turbine mounted relative to the distal end of said fluid outlet hose such that fluid discharged through said outlet hose acts on said blades thereby moving and imparting rotational energy to the rotor shaft;
   a generator operatively connected to said turbine, and adapted for converting the rotational energy generated by said rotor shaft to electrical energy; and
   a battery operatively connected to said generator, and adapted for storing the electrical energy produced by said generator.

2. The vehicle according to claim 1, and comprising an electric motor operatively connected to said battery, and adapted for propelling said vehicle.

3. The vehicle according to claim 1, wherein said positive displacement pump is substantially vertically-disposed between said wheels and said frame.

4. The vehicle according to claim 1, wherein said fluid outlet hose comprises a nozzle for accelerating fluid discharged through its distal end.

5. The vehicle according to claim 1, and comprising respective flow control valves communicating with said fluid inlet and fluid outlet hoses.

6. The vehicle according to claim 1, and comprising a plurality of gravitational positive displacement pumps, wherein a single pump is located adjacent each wheel of said vehicle.

7. The vehicle according to claim 6, wherein said suspension system comprises a coil spring formed adjacent said gravitational positive displacement pump at each wheel of said vehicle.

8. The vehicle according to claim 1, and comprising an electrochemical capacitor located between said generator and said battery.

9. The vehicle according to claim 8, wherein said electrochemical capacitor comprises an ultracapacitor.

10. The vehicle according to claim 1, wherein said onboard fluid source comprises a fluid collection reservoir located beneath said generator.

11. The vehicle according to claim 10, wherein said fluid collection reservoir comprises a baffle assembly adapted for limiting fluid slosh when said vehicle is in motion.

12. A method for converting mechanical energy into electrical energy, comprising:
    installing a gravitational positive displacement pump in a vehicle, the displacement pump adapted for movement in response to a gravitational bounce of the vehicle when in motion;
    upon gravitational bounce of the vehicle, drawing fluid into the displacement pump through a fluid inlet hose;
    discharging fluid from the displacement pump through a fluid outlet hose;
    locating at least one hydraulic accumulator between proximal and distal ends of the fluid outlet hose;
    selectively directing fluid to the hydraulic accumulator;
    mounting a turbine relative to the distal end of the fluid outlet hose, such that fluid discharged through the outlet hose imparts rotational energy to the turbine;
    operatively connecting a generator to the turbine to convert the rotational energy generated by the turbine to electrical energy; and
    storing the electrical energy produced by the generator in a battery.

* * * * *